March 26, 1968  E. C. OKRESS  3,374,941
AIR BLOWER
Filed June 30, 1964  2 Sheets-Sheet 1
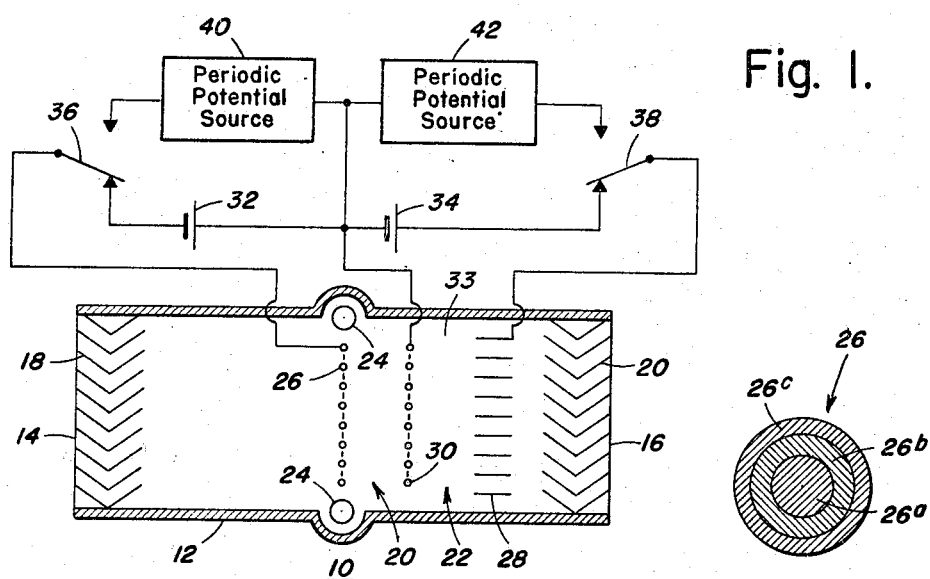
Fig. 1.
Fig. 1a.
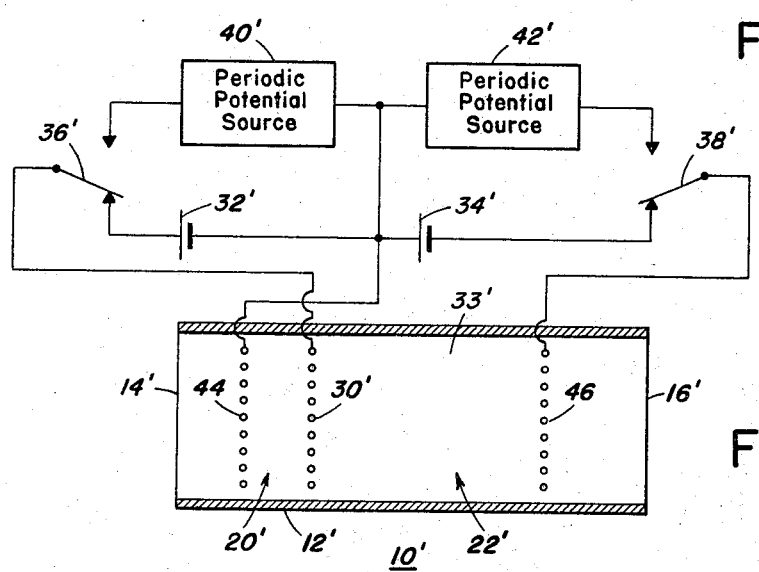
Fig. 2.
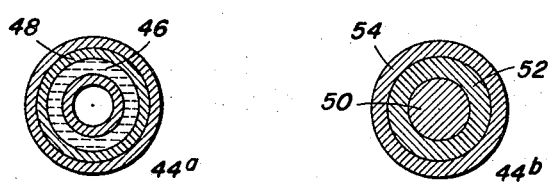
Fig. 2a.   Fig. 2b.
INVENTOR
Ernest C. Okress
BY
Eli Weiss
ATTORNEY March 26, 1968   E. C. OKRESS   3,374,941
AIR BLOWER
Filed June 30, 1964   2 Sheets-Sheet 2
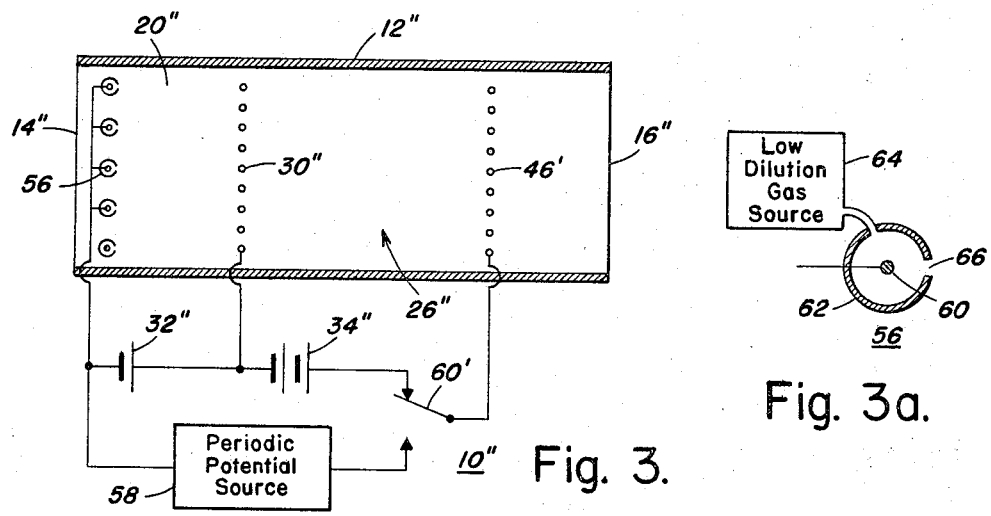
Fig. 3.
Fig. 3a.
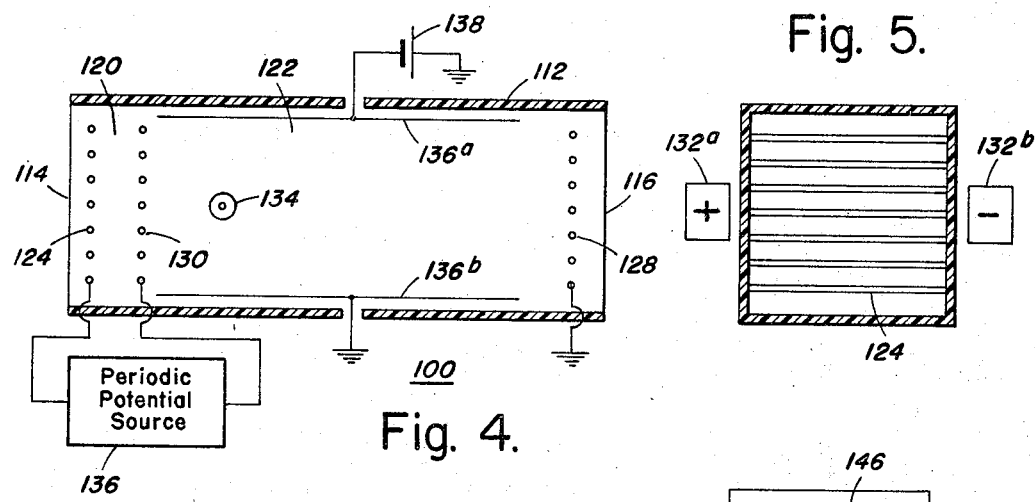
Fig. 4.
Fig. 5.
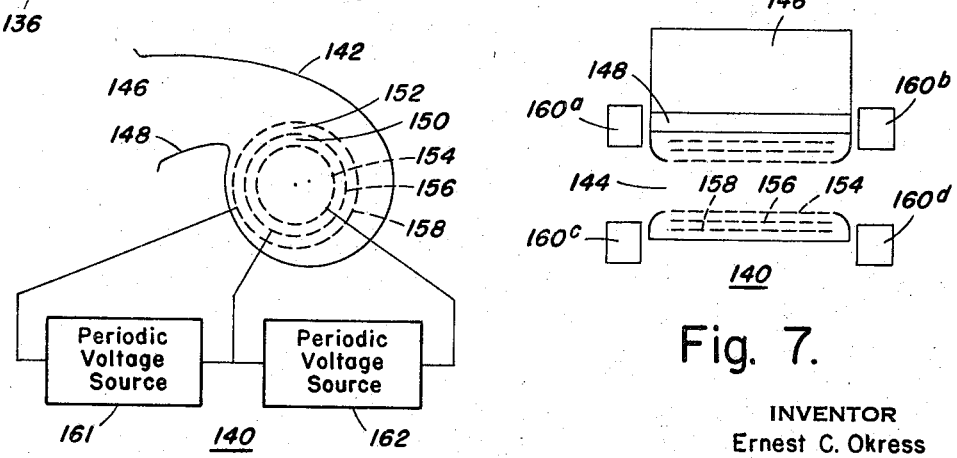
Fig. 6.
Fig. 7.
INVENTOR
Ernest C. Okress
BY
Eli Weiss
ATTORNEY

United States Patent Office 3,374,941
Patented Mar. 26, 1968

3,374,941
AIR BLOWER
Ernest Carl Okress, Elizabeth, N.J., assignor to American Standard Inc., a corporation of Delaware
Filed June 30, 1964, Ser. No. 379,183
10 Claims. (Cl. 230—1)

ABSTRACT OF THE DISCLOSURE

An air blower in the form of a conduit has an inlet and an outlet. Within the conduit is means such as field generating electrodes, or other ionizing devices for ionizing the gas molecules without dissociation. Other field generating electrodes and/or magnetic devices generate fields which accelerate the ionized particles which by normal collision processes drive unionized gas molecules from the conduit outlet.

This invention pertains to air blowers and more particularly to methods and means for electrically imparting directed momentum to air.

Conventional air blowers require moving parts which are generally driven by electrical means such as motors. Such devices are noisy, bulky and subject to wear. There have been proposals to provide devices for air ventilation which directly utilize electricity. In order to do direct electrical work on the air molecules they must first be ionized. The ions are accelerated by magnetic and/or electric fields in a given direction and an air flow is generated. However, normally any ionizing agency applied to air under conditions in which oxygen and nitrogen are dissociated, as well as excited and ionized will normally produce toxic impurities. In particular ozone and oxides of nitrogen are formed. Such by-products, even in small quantities, can cause physiological damage. It has been found that efficient ionizers such as corona discharge means create ozone in quantities two or three times greater than safe industrial minimums. When radioactive polonium is utilized as an air ionizer, minute quantities of polonium are propelled into the air to become airborne contaminants to the human lungs. Other previously known ionizing sources are either too costly or are health hazards.

It is accordingly a general object of the invention to provide an improved air mover.

It is another object of the invention to provide a silent air blower.

It is a further object of the invention to provide an improved air blower or the like which require no moving parts.

It is yet another object of the invention to provide an air blower which while moving the air destroys airborne bacteria, viruses and non-saturated odors by oxidation.

It is yet a still further object of the invention to provide an air blower which dissociates atmospheric gases to a negligible degree.

It is still another object of the invention to provide an air blower which operates directly from domestic power lines and utilizes a minimum of electrical power.

It is also an object of the invention to provide a high efficient air blower which is easily portable and simple in construction.

Briefly, the invention contemplates introducing air into a region where it is ionized by energy insufficient to dissociate the gas molecules of the air, and then to accelerate the ions and electrons in a preferred direction so that mechanical collisions are effected with neutral air molecules for driving the air along a guided path from the region.

Other objects, and the features and advantages of the invention will be apparent from the following detailed description of the invention when read with the accompanying drawings which show by way of example, and not limitation, several embodiments of the invention.

In the drawings:

FIG. 1 is a longitudinal sectional view, partially in schematic, of a surface ionizer-accelerator electrohydrodynamic direct electric air blower in accordance with one embodiment of the invention;

FIG. 1a is an enlarged cross-sectional view of a photoelectric electron ionizer element utilized by the blower of FIG. 1;

FIG. 2 is a longitudinal sectional view, partially in schematic, of another surface ionizer-accelerator electrohydrodynamic type direct electric air blower in accordance with another embodiment of the invention;

FIG. 2a is an enlarged cross-sectional view of a radioisotope electron ionizer element utilizable with the blower of FIG. 2;

FIG. 2b is an enlarged cross-sectional view of an autoelectronic or tunnel electron ionizer element utilizable with the air blower of FIG. 2;

FIG. 3 is a longitudinal sectional view, partially in schematic, of a glow or corona volume ionizer-accelerator electrohydrodynamic direct electric air blower in accordance with another embodiment of the invention;

FIG. 3a shows, in enlraged cross-section, one of the ionizer elements of FIG. 3;

FIG. 4 is a longitudinal sectional view, partially in schematic, of an air blower in accordance with the invention wherein the accelerator includes crossed static electric and magnetic fields;

FIG. 5 is an end view of the air blower of FIG. 4;

FIG. 6 shows in side section a cylindrical type turbine in accordance with another embodiment of the invention; and FIG. 7 is a front-sectional view of the turbine of FIG. 6.

Referring to FIG. 1, there is shown an air blower 10 including a housing 12 having an air inlet 14 and an air outlet 16. Inlet 14 is covered by a louver 18 which is opaque to ultra-violet radiation. Similarly, ultra-violet radiation opaque louver 20 covers outlet 16. Accordingly, by virtue of the geometry of the louvers air can pass through blower 10, but ultra-violet radiation cannot pass from within housing 12. Within housing 12 is an ionizing means 20 and an accelerating means 22. Ionizing means 20 includes a source of ultra-violet radiation 24 operatively disposed with respect to a pluraltiy of ionizing elements 26. Accelerating means 22 includes suitably biased ion collectors 28 which are shown as a plurality of parallel plates but could as well be a gridlike structure. Source 24 emits ultra-violet rays having a wavelength of preferably 2000 A. (Angstrom) or longer. It should be noted that the energy of the photons is insufficient to directly ionize any of the gasses in the air. Furthermore, the photon energy is also insufficient to disassociate the oxygen or nitrogen molecules of the air. Accordingly, negligible quantities of positive ions, ozone or nitrogen oxides are created by the ultra-violet rays. However, the ultra-violet photons impinging on the ionizing elements 26 cause the emission therefrom of photo-electrons. These electrons normally attach to oxygen and water vapor molecular aggregates to form negative ions. Any positive ions are normally associated with carbon dioxide aggregates. These normally small ions generally have a brief half life. However, the recombination rate is generally slow. In fact, some negative ions formed by the attraction of electrons are very stable because of the electron affinity of their atoms. More particularly, the oxygen atoms have an electron affinity far greater than any of the other constituents of air. Therefore, predominantly small negative oxygen ions will be generated along with insignificant quantities of other ions such as the positive carbon dioxide ions. Incidentally, the generated ions would also destroy any airborne bacteria or viruses. It should be noted that it is possible to use a slightly lower wavelength source, i.e. 1849 A. to generate minor quantities of ozone for odor control only.

In order to provide an efficient emitter of photoelectrons at the desired wavelength an ionizing element as shown in FIG. 1a can be employed. The element 26 includes a core 26a of copper. A flash coating 26c of gold of about one hundred atoms thick is deposited on coating 26b. It should be noted that the silver coating 26b is more electro-positive than the copper core 26a and less electropositive than the gold coating 26c. Consequently, the work function of the copper core is reduced and the ejection of electrons by the copper core increased. The thickness of the coatings is limited to the stated thicknesses so that there is no interference with the composite work functions. Since the photoelectrons from a composite emitter are influenced by an applied electric field, battery 32 or the like applies a negative potential to ionizing elements 26. Accordingly the electrons are repelled from the elements 26 and recombination is minimized.

In order to virtually assure that no positive ions move from the ionizing region, an ion filter grid 30 is maintained at a potential which is positive with respect to the elements 26. Therefore, only negative ions and electrons enter the transport region and are accelerated by accelerating means 22.

The directed movement of air in the transport region 32 is accomplished in the following manner: The collision cross sections of the ions and the neutral gas molecules are comparable. Therefore, the ions transfer considerable directed momentum to the neutral molecules upon impact. The ions act like pistons in pushing or dragging the air forward from the ionizing means 20 to the ion collectors 28 and then through the latter. The ions are neutralized by ion collectors 28. In other words, the energy necessary to move the air is supplied by the electric field in the transport region. It can be shown that the pressure build-up in the blower 10 is proportional to the square of the maximum electric field in the transport region 32 which is created by potential source 34.

If pulsed operation is desired switches 36 and 38 can be moved to their up positions to connect periodic potential sources 40 and 42 to the ionizing elements 26, ion filter grid 30 and ion collectors 28.

The air blower 10' of FIG. 2 is similar in most respects to that of FIG. 1. Accordingly, primed reference characters will be used for like elements and only the differences will be discussed in detail. It will be noted that the ion collector 46 is shown as a gridlike structure, however a plate structure similar to that shown in FIG. 1 could just as well be used. The prime difference concerns the source of electrons or ionizing elements 44. A radioactive type is shown in FIG. 2a. Element 44a includes a core element comprising a hermetically sealed tube 46 containing tritium which is covered by thin foil sleeve 48. The tritium emits 18 kev. electrons and has a half life of twelve years. These beta particles readily permeate sleeve 48 to produce ions and, for all practical purposes no dangerous by-products such as radioactive particles, ozone or nitrogen oxides are produced. An alternate ionizing element is element 44b shown in FIG. 2b. Element 44b is an autoelectronic or quantum mechanical tunnel electron emitter which comprises a metal substrate 50 of aluminum, beryllium, etc., having a thickness in the order of 1500 A. An insulating film 52 in the order of 90 A. thick of an oxide of the substrate metal is deposited on substrate 50. A cathode 54, a film layer of gold having a thickness in the order of 150 A. is applied over insulating film 52. Such an emitter provides electron densities of $10^{11}$ electrons/cm.$^2$. However, when elements such as 44b are used the electric fields must be pulsed to avoid thermal breakdown. Therefore, switches 36' and 38' must be in the up position.

It should be noted that all the potential sources of FIGS. 1 and 2 should supply potentials having amplitudes sufficiently low to prevent field ionization of the air molecules.

The air blower 10″ shown in FIG. 3 is similar in many respects to the previously described blowers. Therefore, double primed reference characters will be employed for like elements and only the differences will be discussed in detail. Except for the utilization of a single periodic potential source 58 when pulsed operation is desired the prime difference resides in the generation of the ionizing electrons. Blower 10″ utilizes an oxygen shielded and excited state quenched corona ionizer. It is well known that the corona of a negatively charged point, fine wire or edge in a gas is a very efficient electron source. However, to avoid the generation of toxic ozone, nitrogen oxides and even hydrogen peroxide precautions must be taken. The corona must operate in a slowly moving stream of inert and ultra-violet absorbing gas, such as helium or a highly dilute hydrocarbon, without any free oxygen, or in a stream of an excited state quenching gas such as nitrogen or hydrogen. The electrons attach to oxygen molecules as the gas stream mixes with the air after ionization is complete. Alternatively, a thermionic cathode may be used in a stream of inert or oxygen free gas. Since excited and metastable states of the inert gas can produce ozone when mixed with the air, quenching gases such as hydrocarbons should be introduced into the stream.

In view of the above, a typical ionizing element 56 includes an electrode 60 within a shroud 62 that is connected to a low dilution gas source 64 of inert or oxygen free gas with a low concentration of a quenching gas. If electrode 60 is to operate in corona discharge the electrode is connected to a suitable source of potential. If electrode 60 is to operate as a thermionic cathode it is connected to a source of potential to provide the electrical energy for heating. In either case, the electrons and the gases stream from port 66 into the ionizing region of housing 12″.

The air blower 100 shown in FIGS. 4 and 5 is different from the previously described blowers in that it includes a volume type ionizer to create a plasma instead of surface type ionizers and also includes an accelerator employing crossed electric and magnetic fields instead of an axially aligned electric field. More particularly, blower 100 comprises a housing 112 having an air inlet 114 and an air outlet 116. The interior of housing 112 is divided into an ionizing region 120 and a transport region 122. Operatively associated with ionizing region 120 is an ionizing means including axially spaced grids 124 and 130 connected respectively to periodic potential source 136. Source 136 periodically transmits voltage pulses to the grids with grid 130 becoming positive with respect to grid 124. The field in the ionizing region acts on the incoming air to create a plasma which includes electrons. positive ions, negative ions and neutral molecules. The grid 130 also acts as an ion selector so that substantially only negative ions of oxygen enter the transport region. The transport region 122 extends axially from grid 130 to grid 128 and has therein crossed static electric and magnetic fields. The electric field extends from plate 136b to plate 136a. Plate 136b is grounded and plate 136a is maintained at a potential below ground by battery 138 or equivalent. The magnetic field 134 created by poles 132 (FIG. 5) extends transversely across the transport region 122 and perpendicular to the electric field. The poles 132 can be the poles of a permanent magnet or an electromagnet. The poles are connected by a yoke (not shown). By virtue of the crossed fields and the initial movement of the charged particles (negative ions) the latter are accelerated toward the outlet 116 and push neutral air molecules through the outlet 116 as previously described. Grid 128 which is grounded collects the negative ions.

Normally with diatomic molecules at atmospheric pressure, the duration of enhanced electron temperature with respect to gas temperature is extremely brief, because of the normally fast recombination rate.

The crossed fields referred to comprise:
(1) A magnetostatic field.
(2) Periodic ionizing electric field pulses orthogonal to the magnetostatic field.
(3) Periodic non-ionizing electric field pulses orthogonal to the magnetostatic field.

The difference between (2) and (3) is due to pulse duration.

In item (2), the applied periodic ionizing electric field's pulse duration is such that spark streamer formation is avoided while the electron temperature is enhanced to about that of the gas temperature.

The gas ionization or electrical conductivity of the gas can be increased to the desired level.

In item (3), the applied periodic non-ionizing electric field pulse duration is such that not only is the foregoing condition met, but no significant electron temperature enhancement above that of the gas occurs. The pulse duration is so much shorter that the gas acts as a dielectric.

It should be noted that the cross-field type accelerator described with respect to FIGS. 4 and 5 could be employed in the embodiment shown in FIGS. 1, 2 and 3. Equally, the axial electrostatic field accelerator of FIGS. 1, 2 and 3 can be used in the embodiment of FIGS. 4 and 5.

FIGS. 6 and 7 show a variation of the blower of FIG. 4 in that it is of the cylindrical type. In particular, turbine of blower 140 includes a spiral cowl 142 having a central air inlet 144 and a tangential outlet 146 including a ramp portion 148. Within cowl 142 are an ionizing region 150 between cylindrical grids 154 and 156, and a transport region 152 between cylindrical grids 156 and 158. Connected to grids 154 and 156 is voltage source 162 which periodically generates voltage pulses of sufficient magnitude to excite the electrons of the gas molecules in the air so that a plasma of electrons, positive and negative ions, and neutral gas molecules is established in the ionizing region 150. Grid 156 also acts as an ion selector so that only negative ions of oxygen enter transport region 152. Periodic voltage source 161 generates voltage pulses which cause the creation of a radial electric field in the transport region. Magnetic means 160 establish an axial magnetic field in the transport region. The fields are crossed and unbalanced so that the ions therein spiral and collide with the neutral gas molecules pushing them toward the outlet 146. Grid 158 also acts as an ion collector.

It should be noted that the field type ionizing means of FIG. 6 can be replaced by any of the ionizing means described with respect to FIGS. 1, 2 and 3. Furthermore, it should be noted that A.C. fields could be employed in the transport region.

There has thus been shown improved air blowers which by generating electrons and therefrom ions which transmit momentum to neutral gas molecules drive a mass of air.

While only a limited number of embodiments have been shown and described in detail, there will now be obvious to those skilled in the art many modifications and variations satisfying the objects of the invention and gaining the advantages thereof. For example, although the embodiments have been described as air blowers they are intended to encompass devices such as pumps, turbines, fans and the like. In any event, the scope of the invention is to be measured by the appended claims.

What is claimed is:
1. Apparatus for moving air comprising at least oxygen and nitrogen molecules, said apparatus comprising an elongated hollow conduit having an air inlet and an air outlet, a first grid structure adjacent said air inlet, a second grid structure, axially displaced from said first grid structure, the region between said first and second grid structures defining an ionizing region, a periodic voltage pulse source connected to said first and second grid structures whereby the second grid structure is periodically raised to a potential greater than said first grid structure to generate an ionizing electric field between said grid structures and to prevent the passage of positive ions beyond said ionizing region, the region between said second grid structure and said air outlet defining a transport region, means for generating in said transport region an electric field transverse to the axis of said conduit, and means for generating in said transport region a magnetic field transverse to said axis and perpendicular to said electric field.

2. The apparatus of claim 1 further comprising a third grid structure adjacent said air outlet and means for applying a potential to said third grid structure whereby said third grid structure collects negative ions.

3. Apparatus for moving air comprising a spiral cowl having a central air inlet and a tangential air outlet, a first cylindrical grid structure within said cowl in the region of said central air inlet, a second cylindrical grid structure within said cowl, said second grid structure having a greater diameter than and being coaxial with said first grid structure, the space between said grid structures being an ionizing region, means connected to said grid structures for generating a periodically pulsed electric field between said grid structures, the strength of said electric field being sufficient to at least ionize oxygen molecules and the pulse duration being short enough to prevent the formation of spark streamers, a third grid structure having a diameter greater than and being coaxial with said second grid structure, the space between said second and third grid structures defining a transport region, means connected to said second and third grid structures for establishing a radial electric field in said transport region, and means for establishing an axial magnetic field in said transport region.

4. The apparatus of claim 3 wherein the means for establishing the radial electric field is a periodically pulsed voltage source.

5. The apparatus of claim 3 wherein the duration of the electric field pulses between said first and second grid structures being short enough to prevent the formation of spark streamers.

6. Apparatus for moving air comprising at least oxygen and nitrogen molecules, said apparatus comprising an air conduit having at least an air inlet and an air outlet displaced from said air inlet, ionizing means for creating neagtive ions from some of the oxygen molecules without dissociating the oxygen and nitrogen molecules, and means for accelerating said negative ions toward said air outlet whereby said negative ions collide with the air molecules to propel the latter through said air outlet, said accelerating means including means for generating a periodically occurring electric field axially along a portion of said air conduit.

7. The apparatus of claim 6 further comprising means adjacent said air outlet for collecting the negative ions.

8. The apparatus of claim 6 wherein said ionizing means includes means for generating an electric field of sufficient strength to create a plasma of electrons, positive and negative ions and electrons to be accelerated by said accelerating means.

9. Apparatus for moving air comprising at least oxygen and nitrogen molecules, said apparatus comprising an air conduit having at least an air inlet and an air outlet displaced from said air inlet, ionizing means for creating negative ions from some of the oxygen molecules without dissociating the oxygen and nitrogen molecules, and means for accelerating said negative ions toward said air outlet whereby said negative ions collide with the air molecules to propel the latter through said air outlet, said accelerating means including means for generating an electric field transverse to the axis of said air conduit and means for generating a magnetic field transverse to said axis and perpendicular to said electric field.

10. Apparatus for moving air comprising at least oxygen and nitrogen molecules, said apparatus comprising an air conduit having at least an air inlet and an air outlet displaced from said air inlet; ionizing means for creating negative ions from some of the oxygen molecules without dissociating the oxygen and nitrogen molecules, said ionizing means comprising means for generating a periodically pulsed electric field of sufficient strength to volume ionize the molecules, the duration of each electric field pulse being short enough to avoid spark streamer formation; and means for accelerating said negative ions toward said air outlet whereby said negative ions collide with the air molecules to propel the latter through said air outlet, said accelerating means including means for generating occurring electric field axially along a portion of said air conduit.

References Cited
UNITED STATES PATENTS

| | | | |
|---|---|---|---|
| 2,182,751 | 12/1939 | Reitherman | 230—69 |
| 2,715,993 | 8/1955 | Batina | 230—69 |
| 2,765,975 | 10/1956 | Lindenblad | 230—69 |
| 2,928,942 | 3/1960 | Hicks | 250—44 |
| 2,934,648 | 4/1960 | Leupi | 250—44 |
| 2,972,680 | 2/1961 | Hicks | 250—44 |
| 3,043,977 | 7/1962 | Morowitz | 250—43 |
| 3,047,718 | 7/1962 | Fleming | 250—43 |
| 3,054,553 | 9/1962 | White | 103—1 |
| 3,081,020 | 3/1963 | Rostas | 230—69 |
| 3,128,378 | 4/1964 | Allen | 250—43 |
| 3,156,090 | 11/1964 | Kaufman | 230—69 |
| 3,234,432 | 2/1966 | Streib | 317—4 |
| 3,241,490 | 3/1966 | Ricateau | 103—1 |

FOREIGN PATENTS

| | | |
|---|---|---|
| 1,301,307 | 7/1962 | France. |
| 262,829 | 2/1928 | Great Britain. |

DONLEY J. STOCKING, *Primary Examiner.*

LAURENCE V. EFNER, *Examiner.*

W. L. FREEH, *Assistant Examiner.*